United States Patent
Kulaga et al.

(10) Patent No.: US 11,651,067 B2
(45) Date of Patent: May 16, 2023

(54) SYSTEMS AND METHODS FOR DETECTING STORED PASSWORDS VULNERABLE TO COMPROMISE

(71) Applicant: Acronis International GmbH, Schaffhausen (CH)

(72) Inventors: Andrey Kulaga, Moscow (RU); Stanislav Protasov, Singapore (SG); Serguei Beloussov, Costa del Sol (SG)

(73) Assignee: Acronis International GmbH, Schafthausen (CH)

( * ) Notice: Subject to any disclaimer, the term of this patent is extended or adjusted under 35 U.S.C. 154(b) by 78 days.

(21) Appl. No.: 17/222,455

(22) Filed: Apr. 5, 2021

(65) Prior Publication Data
US 2021/0397697 A1    Dec. 23, 2021

Related U.S. Application Data (60) Provisional application No. 63/042,696, filed on Jun. 23, 2020.

(51) Int. Cl.
*G06F 21/45* (2013.01)
*G06F 21/31* (2013.01)
(Continued)

(52) U.S. Cl.
CPC ............. *G06F 21/45* (2013.01); *G06F 21/31* (2013.01); *G06F 21/602* (2013.01); *G06F 21/6245* (2013.01); *G06F 2221/0751* (2013.01)

(58) Field of Classification Search
CPC ........ G06F 21/45; G06F 21/31; G06F 21/602; G06F 21/6245; G06F 2221/0751; G06F 21/46; G06F 21/577
(Continued)

(56) References Cited

U.S. PATENT DOCUMENTS

| | | | |
|---|---|---|---|
| 2005/0193429 A1* | 9/2005 | Demopoulos | H04L 63/0263<br>713/188 |
| 2013/0227684 A1* | 8/2013 | Troyansky | G06F 21/46<br>726/22 |

(Continued)

OTHER PUBLICATIONS

Horsley, How do you scan for files containing passwords?, May 23, 2016, https://community.spiceworks.com/topic/1626855-how-do-you-scan-for-files-containing-passwords (Year: 2016).*

(Continued)

*Primary Examiner* — Jacob Lipman
(74) *Attorney, Agent, or Firm* — ArentFox Schiff LLP; Michael Fainberg (57) ABSTRACT

Disclosed herein are systems and method for detecting passwords vulnerable to compromise. In one exemplary aspect, a method comprises identifying a plurality of files in at least one storage device of an organization. For each respective file in the plurality of files, in response to determining that the respective file type is in the database of vulnerable file types, the method comprises parsing text in the respective file and identifying, for the respective file, at least one demographic associated with the organization. The method further comprises retrieving dictionaries and expressions specific to the at least one demographic and determining the text in the respective file comprises a password using the retrieved dictionaries and expressions of the at least one demographic. In response to determining that the text comprises the password, the method comprises generating a security alert for an administrator of the storage device.

20 Claims, 3 Drawing Sheets

(51) Int. Cl.
*G06F 21/60* (2013.01)
*G06F 21/62* (2013.01)

(58) Field of Classification Search
USPC .......................................... 726/26
See application file for complete search history.

(56) References Cited

U.S. PATENT DOCUMENTS

2017/0011220 A1* 1/2017 Efremov ............... G06F 21/554
2020/0065476 A1* 2/2020 Boutnaru ............... G06F 21/46
2021/0258151 A1* 8/2021 Cristina ................. G06F 21/602

OTHER PUBLICATIONS

Caseiro, Searching for usernames and passwords in plain text, Jul. 5, 2019, https://www.linkedin.com/pulse/searching-username-passwords-plain-text-bruno-caseiro (Year: 2019).*

* cited by examiner

SYSTEMS AND METHODS FOR DETECTING STORED PASSWORDS VULNERABLE TO COMPROMISE

CROSS-REFERENCE TO RELATED APPLICATIONS

This application claims the benefit of U.S. Provisional Application No. 63/042,696, filed on Jun. 23, 2020, which is herein incorporated by reference.

FIELD OF TECHNOLOGY

The present disclosure relates to the field of data security, and, more specifically, to systems and methods for detecting passwords stored in storage devices.

BACKGROUND

Unsecure password management (e.g., storing passwords in plaintext) is a prominent vector of attack and may result in system/application compromise. For example, in 2017, Equifax had a data breach involving the loss of personally identifiable information for at least 160 million consumers. Equifax stored user passwords in plaintext files. In 2019, Facebook experienced an even bigger data breach in which 400 million Facebook user accounts were compromised. The leak mostly affected Instagram users whose passwords were being stored in plaintext. In 2019, Orvibo, a Chinese home solutions company, had a compromised database with over two billion logs. The leak included usernames, passwords, email addresses, and the precise location of some users.

Security officers may assess data security of such organizations, but it is impossible for security officers to know all possible locations of passwords stored in plaintext for any organization. There is simply too much data to sift through and thus manual checks would demand significant processing power and manpower. Furthermore, certain passwords may not be readily identifiable by a security officer depending on the type of file holding the password.

SUMMARY

To address these shortcomings, aspects of the disclosure describe methods and systems for detecting passwords vulnerable to compromise that are stored in storage devices. In one exemplary aspect, a method comprises identifying a plurality of files in at least one storage device of an organization. For each respective file in the plurality of files, the method comprises determining whether a respective file type of the respective file is in a database of vulnerable file types. In response to determining that the respective file type is in the database of vulnerable file types, the method comprises parsing text in the respective file and identifying, for the respective file, at least one demographic associated with the organization. The method further comprises retrieving dictionaries and expressions specific to the at least one demographic and determining, by a hardware processor, whether the text in the respective file comprises a password using the retrieved dictionaries and expressions of the at least one demographic. In response to determining that the text comprises the password, the method comprises generating a security alert for an administrator of the storage device, wherein the alert indicates vulnerability of the respective file.

In some aspects, the method comprises encrypting the respective file with a public key, and transmitting a private key to the administrator.

In some aspects, the method comprises generating a report indicating the vulnerability of the respective file for reporting to a security officer.

In some aspects, the respective file comprises user account details, wherein identifying the at least one demographic comprises identifying a country of origin in the user account details, and wherein the retrieved dictionaries and expressions are in a language associated with the country of origin.

In some aspects, determining whether the text in the respective file comprises the password is performed using dictionaries and expressions of a first language, and determining whether different text in another respective file comprises a password is performed using dictionaries and expressions of a second language.

In some aspects, the respective file comprises user account details, wherein identifying the at least one demographic comprises identifying an age in the user account details, and wherein the retrieved dictionaries and expressions are for an age group comprising the age.

In some aspects, the respective file comprises user account details, wherein identifying the at least one demographic comprises identifying a gender in the user account details, and wherein the retrieved dictionaries and expressions associated with the gender.

In some aspects, identifying the plurality of files in the storage device further comprises identifying command line logs and data in a registry tree.

In some aspects, the database of vulnerable file types comprises an API key, a token, a cookie, a configuration file, a text file, and a shell script.

In some aspects, determining whether the text in the respective file comprises the password further comprises determining whether at least one of a plurality of known passwords is present in the text, and in response to determining that at least one of the known passwords is present in the text, determining that the text comprises the password.

In some aspects, determining whether the text in the respective file comprises the password further comprises determining whether at least one of a plurality of known password hashes is present in the text, and in response to determining that at least one of the known passwords hashes is present in the text, determining that the text comprises the password.

In some aspects, determining whether the text in the respective file comprises the password further comprises identifying a combination of characters in the text, determining whether a keyword of a plurality of keywords precedes the combination of characters, and in response to determining that the keyword precedes the combination of characters, determining that the text comprises the password.

In some aspects, subsequent to identifying the password, the method comprises checking for a false positive by determining a likelihood of the text comprising the password based on a file name of the respective file, and in response to determining that the likelihood exceeds a threshold likelihood, the method comprises determining that the password in the text is not a false positive.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting stored passwords that are vulnerable to being compromised. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
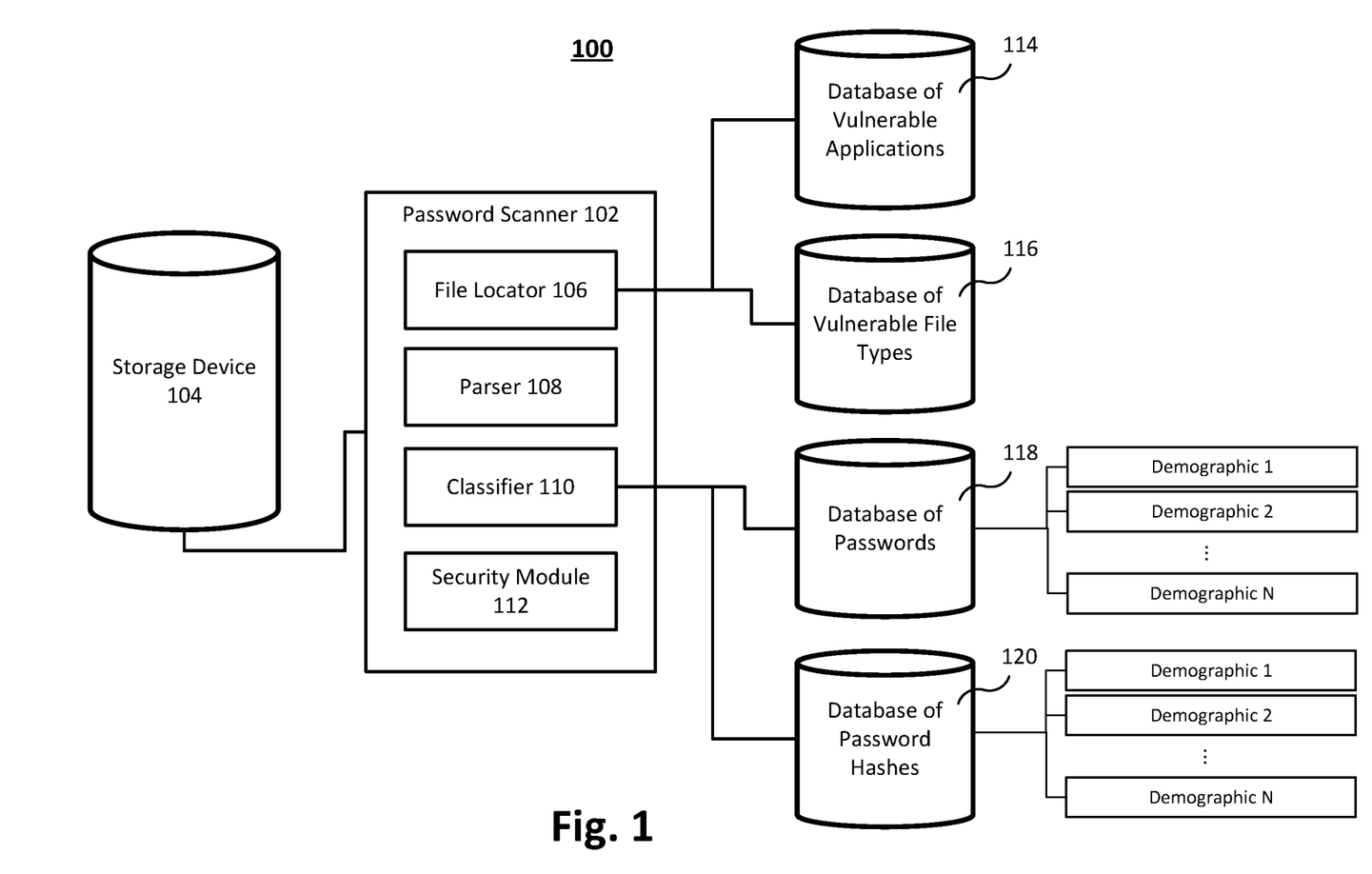
FIG. 1 is a block diagram illustrating a system for detecting vulnerable passwords stored in a storage device, in accordance with aspects of the present disclosure.

FIG. 1 is a block diagram illustrating system 100 for detecting vulnerable passwords stored in a storage device, in accordance with aspects of the present disclosure. System 100 depicts password scanner 102, which may be a stand-alone software executed by a computer system. In some aspects, password scanner 102 is a module of a security software such as an anti-virus software or a data integrity verification software. Password scanner 102 may scan storage device 104 for passwords in various files stored on storage device 104. An indication of poor security measures/standards associated with storage device 104 is if password scanner 102 can in fact detect a password. For example, if storage device 104 stores a file that includes the text "Gmail Email Address: [username]@gmail.com; Password: 12345" and the file is somehow compromised, an attacker will have acquired login credentials to an email account. Password scanner 102 will detect this password and take a security action to resolve the vulnerability because a password detected by password scanner 102 can potentially be detected by an attacker, albeit manually (e.g., by sifting through the file).

In order to detect passwords, password scanner 102 utilizes components including file locator 106, parser 108, classifier 110, and security module 112. File locator 106 identifies a plurality of files in storage device 104 of an organization (e.g., a company, institution, group, home, etc.).

Because there may be thousands of files in storage device 104, file locator 106 may narrow its search, but analyzing only specific files. In some aspects, file locator 106 may refer to a database 114 of vulnerable applications, which may list various pre-identified applications that attackers are most likely to target in any system. For example, an attacker is more likely to attack the files associated with an application that can provide financial information (e.g., credit card numbers) or personal identifiable information (e.g., social security and passport numbers). Accordingly, an application such as an email client (e.g., Microsoft Outlook) will be a more likely target than an application such as a calculator application. File locator 104 may thus search for the applications listed in database 112 when scanning storage device 104 and locate the files stored in directories associated with the applications (e.g., installation directories). In some aspects, file locator 112 may also analyze command line logs and registry trees to identify potential unprotected/vulnerable passwords.

In some aspects, for each respective file in the plurality of files, file locator 106 determines whether a respective file type of the respective file is in a database 116 of vulnerable file types. For example, database 116 may list types of files that most likely include text with password information. Examples of vulnerable file types include, but are not limited to, API keys, tokens, cookies, configuration files, text files, and shell scripts. For example, a MySQL configuration file may list various data including port, socket, maximum allowed packets, etc. The configuration file may also include a password value. In some aspects, file locator 106 may determine the extension (e.g., .TXT) of a respective file and determine whether the extension matches an extension of a vulnerable file type.

In response to determining that the respective file type is in the database 116 of vulnerable file types, parser 108 may parse text in the respective file. Consider an example of a Prometheus configuration file. Prometheus is an open-source systems monitoring and alerting toolkit. Exemplary text of a Prometheus configuration file may be:

```
-job_name: service-kubernetes
    kubernetes_sd_configs:
-role: endpoints
    api_server: 'http://localhost:1234'
    tls_config:
        cert_file: valid_cert_file
        key_file: valid_key_file
    basic_auth:
        username: 'myusername'
        password: 'mysecret'
-job_name: service-kubernetes-namespaces
    kubernetes_sd_configs:
-role: endpoints
    api_server: 'http://localhost:1234'
    namespaces:
        names:
        - default
    basic_auth:
        username: 'myusername'
        password_file: valid_password_file
```

Parser 108 may be a text retrieval software such as dtSearch or a tooklit such as Apache Tika, which can extract text from a wide variety of file types (e.g., PPT, XLS, PDF, TXT, etc.). Parser 108 may store the extracted text from a subset of files (with a vulnerable file type) in a plurality of XML or TXT files. For example, parser 108 may extract the text in the configuration file shown above and store it in a TXT file.

Subsequently, classifier 110 determines, by a hardware processor, whether the text in the respective file comprises a password. In the example above, the configuration file includes a password called mysecret. In some aspects, classifier 110 may utilize a lexer generator that generates fast lexers to detect the password. For example, a regular expression which can be complied with re2c for an email address is ['',' \n'\r'\t']([A-Z]]?)([a-z0-9]+)[@]([a-z0-9'.'])+. Similarly, expressions for passwords may be compiled to detect the password in the parsed text.

In some aspects, classifier 110 may determine whether at least one of a plurality of known passwords is present in the parsed text. In particular, classifier 110 may compare common passwords stored in database 118 of passwords with the text. A common password may be a pre-identified password that is often used by attackers during a brute-force attack. Examples of common passwords include "password," "12345," "abc123," etc. If a common password is detected in a file of a vulnerable file type such as a configuration file, classifier 110 classifies that the parsed text includes a password.

In some cases, the passwords listed in a file may be hashed. Nonetheless, there are common password hashes that may also be subjected to a brute-force attack. For example, if the hash is performed using an algorithm such as MD5, a password hash such as "5f4dcc3b5aa765d61d8327deb882cf99" is easily detectable as it is the MD5 hash of the term "password." Accordingly, in some aspects, classifier 110 may determine whether at least one of a plurality of known password hashes stored in database 120 of passwords hashes is present in the text. If a common password hash is detected in a file of a vulnerable file type such as a configuration file, classifier 110 classifies that the parsed text includes a password.

In an exemplary aspect, database 118 of passwords and database 120 of password hashes are divided based on various demographics. Demographics include, but are not limited to, gender, age, country of origin/residence, employment, etc. For example, there may be passwords that are more widely used by teenagers in comparison to adults. Rather than searching across a full database of passwords and/or password hashes, classifier 110 may start by focusing on a demographic and move on to another demographic if the first attempt yields no results.

More specifically, classifier 110 may identify, for a given file, at least one demographic associated with the organization. Suppose that the file contains user account details for an international video streaming platform. The file may specifically include IP addresses, usernames, passwords, billing details, etc., for various users of the platform. Classifier 110 may identify a country of origin in the user account details and retrieve dictionaries and expressions that are in a language associated with the country of origin. For example, the country of origin for the user accounts may be France. Classifier 110 may access regional resources in databases 118 and 120 such as a French dictionary comprising words, phrases, expressions, etc., commonly used as passwords. By extension, if a different file comprised user account details for accounts in India, the language for which classifier 110 retrieves dictionaries and expressions in databases 118 and 120 is Hindi. The databases may map a plurality of languages associated with each country, state, region, etc. The country of origin may also be determined using GPS coordinates of a device the user used, an IP address, or the language in which the text is written in the file.

In some aspects, the demographic may be an age associated with a user. Accordingly, databases 118 and 120 may further be organized in age groups. This is because the word combinations used by children may differ from those used by teenagers, which may differ from those used by adults, which may differ from those used by the elderly. In some aspects, the demographic may be gender-based. Accordingly, databases 118 and 120 may further be organized in gender groups. This is because the common phrases used by females may differ from the common phrases used by males.

It should be noted that classifier 110 may identify at least one demographic that a file of the organization is associated with. In other words, for a given file, classifier 110 may retrieve multiple dictionaries and expressions. For example, a user account may belong to a teenage female in India. Classifier 110 may thus retrieve dictionaries associated with the language Hindi, the age group 13-19 years old, and females. In some aspects, classifier 110 may generate a custom search that limits searches to passwords commonly used by female Hindi-speakers that are between the age range 13-19.

The importance of running password searches based on demographics lies in quicker detection speeds and less processing exertion. The efficient detection mechanism enables password scanner 102 to detect passwords in, for example, various languages other than English and perform the detection without unnecessarily searching through parts of databases 118 and 120 that are limited to a language not related to an organization or a given user. Various organizations cater their product/services/assignments to a particular demographic. For example, a university may largely be composed of a study body within a certain age group and at a particular location. Detecting passwords for the university setting will thus largely differ from an organization such as a hospital that employs medical professionals in a different location.

In some aspects, classifier 110 may identify a combination of characters in the text (e.g., mysecret) and determine whether a keyword of a plurality of keywords precedes the combination of characters. The plurality of keywords may be an indication of a password. For example, a keyword may be "password:" or "PWD:". In some cases, classifier 110 may search for a combination of keywords within a threshold number of characters. For example, classifier 110 may search for both "username:" and "password:" in a text file (with/without a colon) and if the two terms are detected within 40 characters or two words from one another, classifier 110 may identify the combination of characters directly after "password:" as a password. In other words, in response to determining that the keyword precedes the combination of characters, classifier 110 determines that the text comprises the password.

In some aspects, subsequent to identifying the password, classifier 110 may check for a false positive by determining a likelihood of the text comprising the password based on a file name of the respective file. Certain file names are a clear indication that a file is expected to contain passwords. For example, in PostgreSQL, the file ".pgpass" in a user's home directory or the file referenced by PGPASSFILE can contain passwords. Accordingly, in response to detecting a possible password, classifier 110 may assign a likelihood of the password being an actual password. In some aspects, the likelihood is a qualitative value such as "definitely," "likely," "possible," etc. In other aspects, the likelihood is a quantitative value such as a fraction, a percentage, or any other number bounded by a range (e.g., 1-10). In response to determining that the likelihood (e.g., 75%) exceeds a threshold likelihood (e.g., 70%), classifier 110 determines that the password in the text is not a false positive (i.e., it is a password). The likelihood may be a function of the difference between a text phrase in a file and a known password (e.g., the known password may be "hello" and the text may be "hello123"), the difference in file name of a file and a known file name (e.g., "PGPASSFILE" may be the known file and "PGWORDFILE" may be the file in question), and the separation between a keyword (e.g., "PWD:") and the text phrase (e.g., the separation may be 1 word away). The greater the difference or separation, the lower the likelihood.

Ultimately, once a password is detected by password scanner 102, a security action is executed by security module 112. The security action comprises at least one of (1) generating and transmitting a security alert to an administrator of the storage device, wherein the alert indicates vulnerability of the respective file, (2) encrypting the respective file with a public key, and transmitting a private key to the administrator, and (3) generating a report indicating the vulnerability of the respective file for reporting to a security officer. These actions are meant to protect the file from being compromised by either making the file unreadable without decryption or by bringing the vulnerabilities to the attention of the administrator or a security officer.

Figure 2:
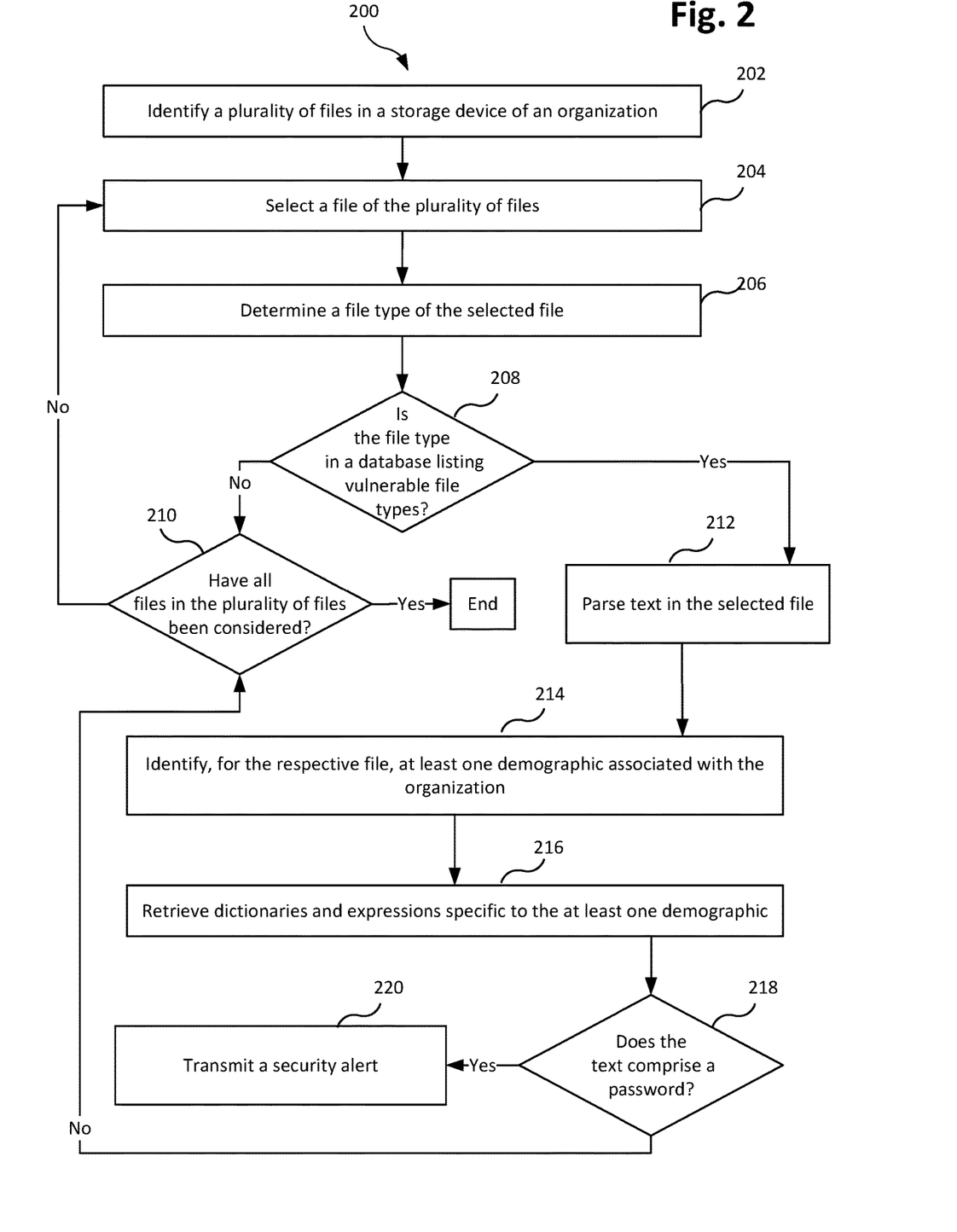
FIG. 2 illustrates a flow diagram of a method for detecting vulnerable passwords stored in a storage device, in accordance with aspects of the present disclosure.

FIG. 2 illustrates a flow diagram of method 200 for detecting vulnerable passwords stored in a storage device, in accordance with aspects of the present disclosure. At 202, file locator 106 identifies a plurality of files in a storage device of an organization. At 204, file locator 106 selects a file of the plurality of files. At 206, file locator 106 determines a file type of the selected file.

At 208, file locator 106 determines whether the file type is in a database listing vulnerable file types. In response to determining that it is, parser 108 parses text in the selected file. If the file type is not in the database, method 200 advances to 210, where file locator 106 determines whether all files in the plurality of files have been considered. If all of them have not been considered, method 200 returns to 204, where a different file is selected by file locator 106.

Subsequent to parsing the text, at 214, parser 108 and classifier 110 identify, for the respective file, at least one demographic associated with the organization. At 216, classifier 110 retrieves dictionaries and expressions specific to the at least one demographic. At 218, using the retrieved dictionaries and expressions, classifier 110 determines whether the parsed text includes a password. In response to determining that the text includes a password, at 218, security module 112 transmits a security alert. However, if the text does not comprise a password, method 200 returns to 210. If at 210, file locator 106 determines that all files have been considered, method 200 ends. Otherwise, a new file is selected for password detection.

Figure 3:
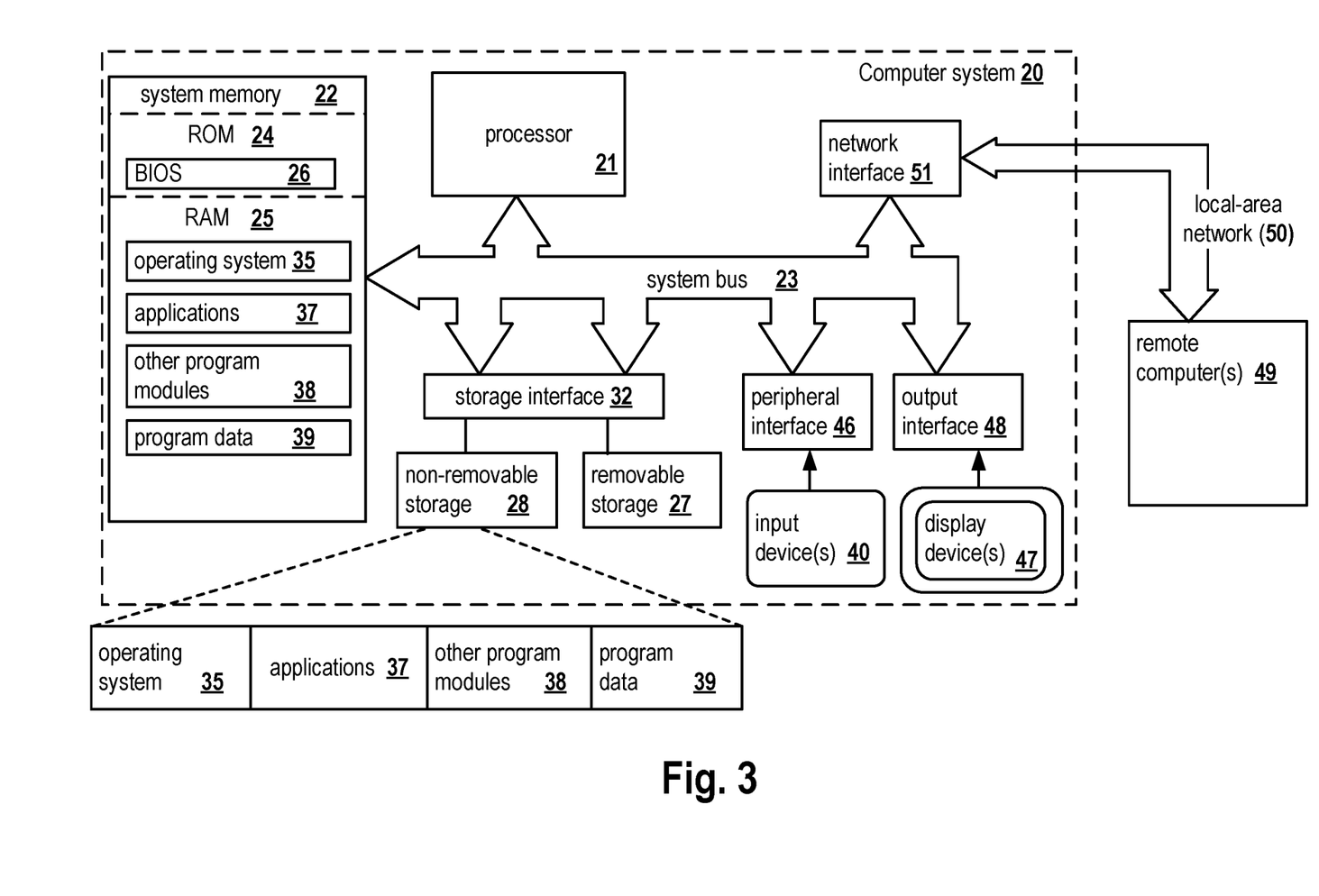
FIG. 3 presents an example of a general-purpose computer system on which aspects of the present disclosure can be implemented.

FIG. 3 is a block diagram illustrating a computer system 20 on which aspects of systems and methods for detecting vulnerable passwords stored in a storage device may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting vulnerable passwords, the method comprising:
   identifying a plurality of files in at least one storage device of an organization;
   for each respective file in the plurality of files:
      determining whether a respective file type of the respective file is in a database of vulnerable file types;
      in response to determining that the respective file type is in the database of vulnerable file types, parsing text in the respective file;
      identifying, for the respective file, at least one demographic associated with the organization, wherein the at least one demographic comprises one or both of: an age and a gender;
      retrieving dictionaries and expressions specific to the at least one demographic wherein the retrieved dictionaries and expressions are specific to one or both of an age group comprising the age and the gender;
      determining, by a hardware processor, whether the text in the respective file comprises a password using the retrieved dictionaries and expressions of the at least one demographic; and
      in response to determining that the text comprises the password, generating a security alert for an administrator of the storage device, wherein the alert indicates vulnerability of the respective file.

2. The method of claim 1, wherein the respective file comprises user account details, and wherein identifying the at least one demographic comprises identifying the age in the user account details.

3. The method of claim 1, wherein the respective file comprises user account details, and wherein identifying the at least one demographic comprises identifying the gender in the user account details.

4. The method of claim 1, wherein identifying the plurality of files in the storage device further comprises identifying command line logs and data in a registry tree.

5. The method of claim 1, wherein the database of vulnerable file types comprises an API key, a token, a cookie, a configuration file, a text file, and a shell script.

6. The method of claim 1, wherein determining whether the text in the respective file comprises the password further comprises:
   determining whether at least one of a plurality of known passwords is present in the text; and
   in response to determining that at least one of the known passwords is present in the text, determining that the text comprises the password.

7. The method of claim 1, wherein determining whether the text in the respective file comprises the password further comprises:
   determining whether at least one of a plurality of known password hashes is present in the text; and
   in response to determining that at least one of the known passwords hashes is present in the text, determining that the text comprises the password.

8. The method of claim 1, wherein determining whether the text in the respective file comprises the password further comprises:
   identifying a combination of characters in the text;
   determining whether a keyword of a plurality of keywords precedes the combination of characters; and
   in response to determining that the keyword precedes the combination of characters, determining that the text comprises the password.

9. The method of claim 1, further comprising:
   subsequent to identifying the password, checking for a false positive by determining a likelihood of the text comprising the password based on a file name of the respective file; and
   in response to determining that the likelihood exceeds a threshold likelihood, determining that the password in the text is not a false positive.

10. The method of claim 1, further comprising:
    encrypting the respective file with a public key, and transmitting a private key to the administrator.

11. The method of claim 1, further comprising:
    generating a report indicating the vulnerability of the respective file for reporting to a security officer.

12. The method of claim 1, wherein the respective file comprises user account details, and wherein identifying the at least one demographic comprises identifying a country of origin in the user account details, and wherein the retrieved dictionaries and expressions are in a language associated with the country of origin.

13. The method of claim 12, wherein determining whether the text in the respective file comprises the password is performed using dictionaries and expressions of a first language and determining whether different text in another respective file comprises a password is performed using dictionaries and expressions of a second language.

14. A system for detecting vulnerable passwords, the system comprising:
    a hardware processor configured to:
       identify a plurality of files in at least one storage device of an organization;
       for each respective file in the plurality of files:
          determine whether a respective file type of the respective file is in a database of vulnerable file types;
          in response to determining that the respective file type is in the database of vulnerable file types, parse text in the respective file;
          identify, for the respective file, at least one demographic associated with the organization, wherein the at least one demographic comprises one or both of: an age and a gender;
          retrieve dictionaries and expressions specific to the at least one demographic, wherein the retrieved dictionaries and expressions are specific to one or both of an age group comprising the age and the gender;
          determine whether the text in the respective file comprises a password using the retrieved dictionaries and expressions of the at least one demographic; and
          in response to determining that the text comprises the password, generate a security alert for an administrator of the storage device, wherein the alert indicates vulnerability of the respective file.

15. The system of claim 14, wherein the respective file comprises user account details, and wherein the hardware processor is configured to identify the at least one demographic by identifying the age in the user account details.

16. The system of claim 14, wherein the respective file comprises user account details, and wherein the hardware processor is configured to identify the at least one demographic by identifying the gender in the user account details.

17. The system of claim 14, wherein the hardware processor is configured to identify the plurality of files in the storage device by identifying command line logs and data in a registry tree.

18. The system of claim 14, wherein the respective file comprises user account details, and wherein the hardware processor is configured to identify the at least one demographic by identifying a country of origin in the user account details, and wherein the retrieved dictionaries and expressions are in a language associated with the country of origin.

19. The system of claim 18, wherein determining whether the text in the respective file comprises the password is performed using dictionaries and expressions of a first language and determining whether different text in another respective file comprises a password is performed using dictionaries and expressions of a second language.

20. A non-transitory computer readable medium storing thereon computer executable instructions for detecting vulnerable passwords, including instructions for:
- identifying a plurality of files in at least one storage device of an organization;
- for each respective file in the plurality of files:
- determining whether a respective file type of the respective file is in a database of vulnerable file types;
- in response to determining that the respective file type is in the database of vulnerable file types, parsing text in the respective file;
- identifying, for the respective file, at least one demographic associated with the organization, wherein the at least one demographic comprises one or both of: an age and a gender;
- retrieving dictionaries and expressions specific to the at least one demographic wherein the retrieved dictionaries and expressions are specific to one or both of an age group comprising the age and the gender;
- determining, by a hardware processor, whether the text in the respective file comprises a password using the retrieved dictionaries and expressions of the at least one demographic; and
- in response to determining that the text comprises the password, generating a security alert for an administrator of the storage device, wherein the alert indicates vulnerability of the respective file.

\* \* \* \* \*